(12) United States Patent
Almy et al.

(10) Patent No.: US 9,748,892 B2
(45) Date of Patent: Aug. 29, 2017

(54) CLIP-IN MOUNTING SYSTEM FOR PHOTOVOLTAIC SYSTEMS

(71) Applicant: SolarCity Corporation, San Mateo, CA (US)

(72) Inventors: Charles Almy, Berkeley, CA (US); Tyrus Hudson, San Rafael, CA (US); David Molina, San Rafael, CA (US)

(73) Assignee: SolarCity Corporation, San Mateo, CA (US)

( * ) Notice: Subject to any disclaimer, the term of this patent is extended or adjusted under 35 U.S.C. 154(b) by 16 days.

(21) Appl. No.: 14/810,232

(22) Filed: Jul. 27, 2015

(65) Prior Publication Data

US 2017/0033730 A1    Feb. 2, 2017

(51) Int. Cl.
  *H02S 20/23*   (2014.01)
  *F16B 1/00*    (2006.01)
  *H02S 20/30*   (2014.01)
  *H02S 30/10*   (2014.01)

(52) U.S. Cl.
  CPC ............... *H02S 20/23* (2014.12); *F16B 1/00* (2013.01); *H02S 20/30* (2014.12); *H02S 30/10* (2014.12); *F16B 2001/0064* (2013.01)

(58) Field of Classification Search
  CPC .......... H02S 20/00; H02S 20/22; H02S 20/23; H02S 20/30
  USPC .......................... 52/24, 25; 248/228.1–228.8
  See application file for complete search history.

(56) References Cited

U.S. PATENT DOCUMENTS

| | | | |
|---|---|---|---|
| 5,164,545 A * | 11/1992 | Kreinberg | H01R 4/64 174/78 |
| 6,269,596 B1 * | 8/2001 | Ohtsuka | E04D 3/366 126/621 |
| 6,592,089 B1 * | 7/2003 | Leguil | B25B 5/006 248/228.3 |
| 7,350,760 B2 * | 4/2008 | Yamaura | B25B 5/08 24/327 |
| 7,621,487 B2 * | 11/2009 | Brown | F16L 3/24 248/65 |
| 7,770,859 B2 * | 8/2010 | Costabel | F16B 2/10 248/214 |
| 8,152,120 B2 * | 4/2012 | Barrett | B60R 9/06 248/226.11 |
| 8,650,812 B2 | 2/2014 | Cusson | |
| 8,726,587 B2 | 5/2014 | Nuernberger et al. | |
| 8,839,573 B2 | 9/2014 | Cusson et al. | |
| 9,003,729 B2 | 4/2015 | West et al. | |
| 9,353,527 B2 * | 5/2016 | Smeja | E04D 13/00 |
| 2002/0061225 A1 * | 5/2002 | Boucher | F16B 2/185 403/386 |

(Continued)

*Primary Examiner* — Paola Agudelo
(74) *Attorney, Agent, or Firm* — Kilpatrick Townsend & Stockton LLP

(57) ABSTRACT

A photovoltaic (PV) mounting system having a base portion with a plurality of rails. The system includes a spring clip unit having a foot configured to hold a PV module coupling device and arranged to slide on one of the plurality of rails. A first spring clip is moveable on the foot from a first position in which the first spring clip is disengaged with the rail to allow the foot to move freely along the rail, to a second position in which the first spring clip engages the rail to attach the foot to the rail. A second spring clip is held by the foot and is forcibly engaged with the rail when the first spring clip is moved to the second position to help lock the foot.

17 Claims, 6 Drawing Sheets

(56) References Cited

U.S. PATENT DOCUMENTS

| | | | |
|---|---|---|---|
| 2011/0100434 A1 | 5/2011 | Van Walraven | |
| 2013/0011187 A1 | 1/2013 | Schuit et al. | |
| 2013/0102165 A1* | 4/2013 | DuPont | F24J 2/4607 439/95 |
| 2013/0192150 A1* | 8/2013 | DuPont | F24J 2/5203 52/173.3 |
| 2014/0130847 A1 | 5/2014 | West et al. | |
| 2014/0175244 A1* | 6/2014 | West | F24J 2/5205 248/316.7 |
| 2014/0196766 A1 | 7/2014 | Schumacher et al. | |
| 2015/0155823 A1 | 6/2015 | West et al. | |
| 2015/0311854 A1* | 10/2015 | Goehringer | F16M 13/02 211/41.1 |
| 2016/0069592 A1* | 3/2016 | Giraudo | H02S 20/23 126/704 |

* cited by examiner

CLIP-IN MOUNTING SYSTEM FOR PHOTOVOLTAIC SYSTEMS

BACKGROUND OF THE INVENTION

There are many systems available for mounting photovoltaic (PV) modules to building structures, such as a roof. These systems serve as a rigid interconnection element between a roof and a PV module to hold the modules in place and resist the forces of gravity and wind.

Traditionally, mounting systems consisted of rows of rail structures attached to the roof in columns or rows. Module clamps were used to attach the PV modules to these rail structures. Although effective, these traditional systems required complex and time-consuming installations and utilized relatively large amount of materials. Eventually, pioneers in the solar industry, such as Jack West of San Rafael-based Zep Solar, realized that module frames themselves are sufficiently rigid to function as the rails of a PV mounting system. By utilizing the inherent rigidity of modules frames as part of the PV mounting system, system part counts and costs of PV mounting systems were significantly reduced while installation time and overall aesthetics were improved. This realization caused the majority of the residential solar industry to move away from rail-based solutions. However, in order to continue the momentum of solar against other fossil fuel-based energy sources, it is imperative that both hard and soft PV costs continue to be reduced.

Most rail-free or so-called direct mount systems, rely on pillar-like PV module supports which connect to each module frame at various points around the array—typically at least four points on each module. These module supports are in turn attached to the roof, either into a roof rafter or directly to the roof deck, via a flashing. The flashing is just a flat sheet of aluminum with a preformed feature designed to mate with the module support and typically including at least one lag-bolt through-hole for securing both the flashing and the module support to the roof.

Although effective at reducing water leaks and covering missed drill holes, flashings can increase the time of installation because when they are used, the installer must complete all site preparation first before placing any of the PV modules, installing a flashing at each intended roof penetration. This bottleneck prevents an installer from installing the array row-by-row or panel-by-panel and, as a result, may slow-down the rate at which PV may be installed, may require larger installation crews, or both. Also, because each flashing gets tucked underneath the next up-roof course of shingles, it is often necessary to remove existing roofing nails to accommodate the flashings. Each time an existing roofing nail is removed, a new potential leak point is created. Finally, each flashing adds a material cost to each solar installation that becomes significant when multiplied against every roof penetration of every installed array.

Accordingly, there is a need for a rail-free PV mounting system that enjoys the benefits of existing rail-free solutions, while reducing costs, and increasing installation times relative to such systems.

BRIEF SUMMARY OF THE INVENTION

Many embodiments of the invention are directed to a photovoltaic (PV) mounting system having a base portion with at least one rail. The system can include at least one spring clip unit having a foot configured to hold a PV module coupling device and arranged to slide on one of the plurality of rails. A first spring clip may be moveable on the foot from a first position, in which the first spring clip is disengaged with the at least one rail to allow the foot to move freely along the at least one rail, to a second position, in which the first spring clip engages the rail to laterally lock the foot to the at least one rail. The foot can hold a second spring clip. The second spring clip may be forcibly engaged with the at least one rail to vertically lock the foot to the at least one rail.

In many embodiments, each rail of the plurality of rails can include a pair of channels that the foot slides within.

In many embodiments, the first spring clip can include an elongated lever extending to a first tab and a second tab.

In many embodiments, the first tab and a second tab can each be arranged to pass through the foot and engage the base when the lever is actuated to the second position of the first spring clip.

In many embodiments, the first tab and a second tab may be each arranged to disengage from the base when the lever is actuated to the first position of the first spring clip.

In many embodiments, the second spring clip can include teeth arranged to forcibly engage the at least one rail and form a ground connection between the foot and the at least one rail.

Many embodiments of the invention are directed to a photovoltaic mounting system (PV) with a base portion having a plurality of raised rail portions, with each raised rail portion having a pair of channels on either side of the rail portion. The base portion can further include a through-hole for accommodating a roof surface attachment bolt. At least one spring clip unit may be provided with the system. The at least one spring clip unit can include a first lever-actuated spring clip that in a first position allows the at least one spring clip unit to fit over and move freely on one of the raised rail portions, and that in a second position causes a pair of tabs connected to the lever-actuated spring clip to engage the pair of channels in the raised rail portion. A second spring clip can engage the top of one of the raised rail portions, and include one or more teeth that form a ground bond with the raised rail portion when the first lever-actuated spring clip is moved into the second position. A PV module coupling device attached to the at least one spring clip unit may be provided and may be adapted to engage the frames of at least two PV modules while maintaining a space in between them.

In many embodiments, the first lever-actuated spring clip can include an elongated lever extending to a pair of corner portions that narrow and widen with respect to each other according to positioning of the first lever-actuated spring clip.

In many embodiments, the pair of tabs can narrow and widen along with corresponding movement of the corner portions.

In many embodiments, the first lever-actuated spring clip may be a wire-form structure.

In many embodiments, the second spring clip may be formed as at least one body that extends in cantilever from the at least one spring clip unit.

In many embodiments, the teeth are formed at a free end of the at least one body.

In many embodiments, the PV module coupling device has an upper and lower clamp arranged to clamp onto top and bottom portions of a PV module In many embodiments, each raised rail portion has a male shape.

In many embodiments, the at least one spring clip unit has a female shape that is complimentary to the male shape.

Many embodiments are also directed to a PV mounting system having a base portion with at least one rail. The system can include at least one spring clip unit configured to hold a PV module coupling device and comprising at least one lever to lock the at least one spring clip unit to the at least one rail.

In many embodiments, the at least one lever may be movable to unlock the at least one spring clip unit from the at least one rail.

In many embodiments, a first movement of the at least one lever can cause tabs of the least one spring clip unit to narrow and engage the at least one rail.

In many embodiments, a second movement of the at least one lever that is opposite to the first movement can cause the tabs of the least one spring clip unit to forcibly spread apart from the at least one rail.

In many embodiments, the at least one spring clip unit can include a plurality of levers.

In many embodiments, the at least one spring clip unit can have teeth for engaging the at least one rail.

DETAILED DESCRIPTION OF THE INVENTION

Embodiments of the invention are generally directed towards a system for mounting a PV panel to a support structure such as a roof surface. The system can include a base portion assembly and a foot assembly for supporting a PV panel. The foot assembly may include a spring clip unit that when actuated from a first position to a second position with the base portion assembly, provides a boltless system for rigidly fixing the foot assembly to the base portion assembly in a sufficient manner to support the weight of one or more PV panels. Advantageously, such a system requires little to no tools for installation, and hence installation time is greatly reduced over prior systems that require additional tools and bolting. The following description details some examples of such a system.

Figure 1A:
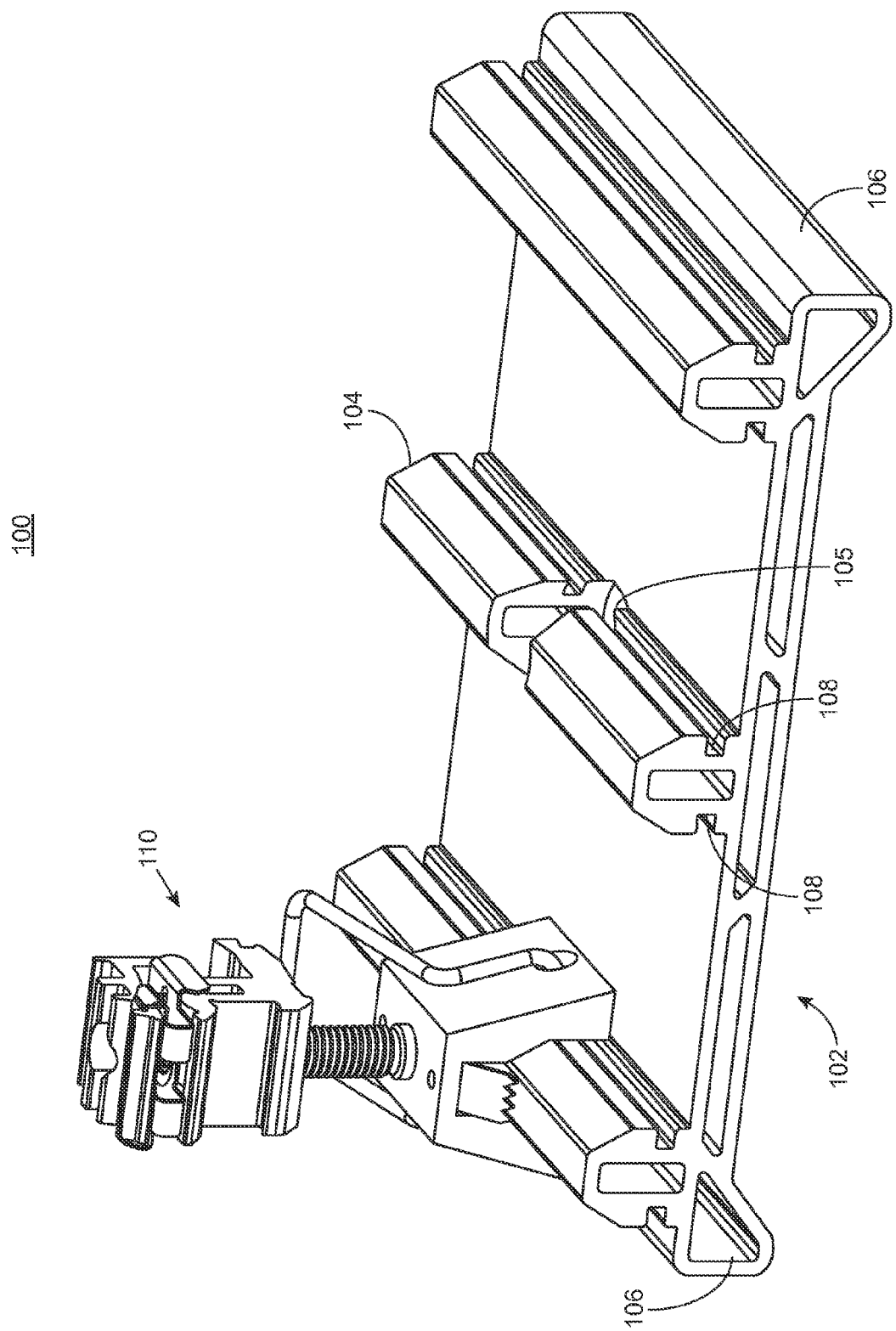
FIG. 1A shows a perspective view of an exemplary PV mounting system, according to an embodiment of the invention.

FIG. 1A shows a system 100 for mounting a photovoltaic (PV) panel to a structure, such as a roof. The system 100 includes a base portion 102 having a plurality of raised portions, depicted here as rails 104. Here, three rails 104 are shown, although more or less may be provided. Base portion 102 also includes passage 105 for mounting base portion 102 to a roof with a mechanical fastener, such as a lag bolt.

Base portion 102 is generally planer in shape with lateral edges 106 that raise base portion 102 above a mounting surface to help with drainage and clear obstacles. Base portion 102 may be formed from an extrusion and as shown, include a plurality of passages to mitigate excess weight. The specific passages shown in the figures are exemplary only. More, fewer or different passage may incorporated into base portion 102 in various embodiments of the invention.

Figure 1B:
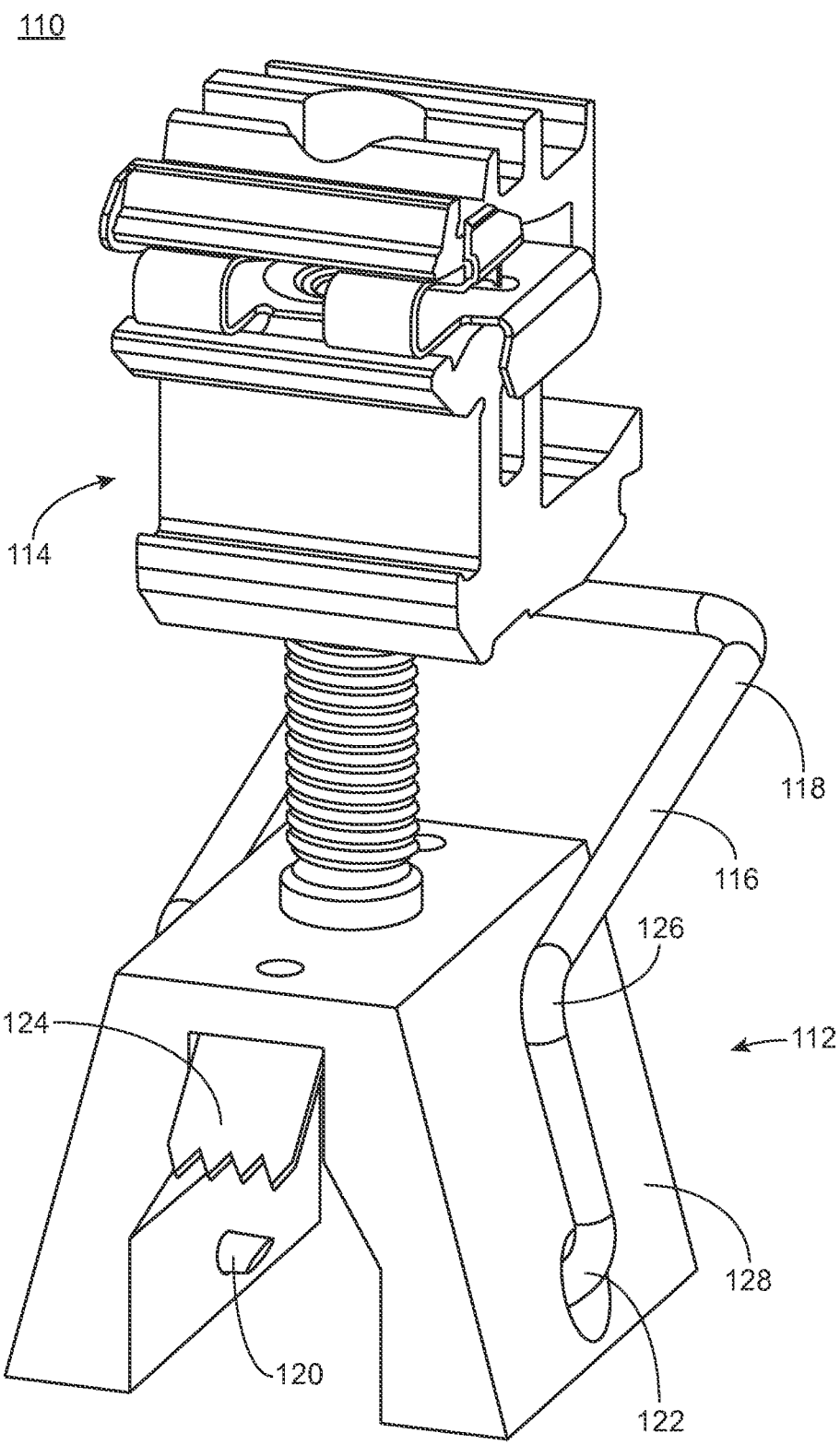
FIG. 1B shows a perspective view of an aspect of the system of FIG. 1A.

Each rail 104 generally has channels 108 formed within an A-shaped cross-section to provide a generally male interlocking shape for spring clip unit 110, which is shown in detail at FIG. 1B.

Spring clip unit 110 includes foot 112, which here is configured as an elongated body with a generally female cross-section that is complimentary with respect to rails 104 of base portion 102, to enable the spring clip unit 110 to slide over rails 104. Foot 112 supports a PV module coupling device 114 adapted to engage the frames of at least two PV modules while maintaining a space in between them.

Elongated beam 124 leads to PV module mounting platform 126 that supports PV module coupling device 128 configured to couple together the frames of at least two photovoltaic modules. PV module coupling device 128 in FIGS. 1A and 1B is a "rock-it" style connector manufactured by SolarCity Corp., which is arranged to connect to respective frames of two adjacent PV modules. Such a coupling device is described and illustrated, for example, in commonly assigned U.S. patent application Ser. No. 14/615,320, Publication No. 2015/0155823-A1, the disclosure of which is herein incorporated by reference in its entirety. However, system 100 is not limited to use of such a coupling device. A multitude of different styles of coupling devices are compatible with the system, for example, such as the coupling device 132 illustrated at FIG. 4, which depicts a clamping-style coupling device 132 with an upper and lower clamp arranged to clamp the top and bottom portions of a PV module.

Continuing with FIGS. 1A and 1B, spring clip unit 110 includes first spring clip 116 having a wire-form structure forming lever portion 118 that extends laterally away from foot 112. The wire-form structure also extends to first tab 120 and second tab 122 that extend through passages within the foot 112. Spring clip unit 110 also includes second spring clip 124 having a pair of bodies extending in cantilever from foot 112 and having sets of teeth angled downwardly towards the top of rail 104, however, only one body can be used.

The wire-form structure of first spring clip 116 also includes corner portions 126 that lay between lever portion 118 and first tab 120 and second tab 122. The wire-form structure is formed such that corner portions 126 place compressive force against tapered sides 128 of foot 112. Hence, travel along tapered sides 128 causes corner portions 126 to narrow and widen with respect to each other, which causes first tab 120 and second tab 122 to narrow and widen in the same manner.

Figure 2A:
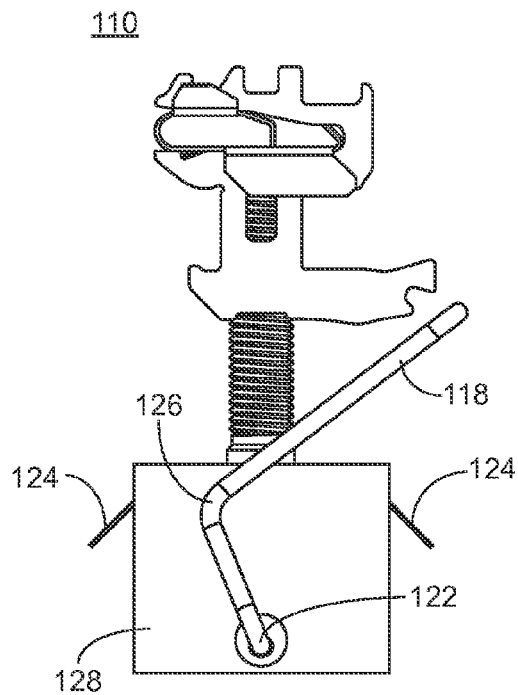
FIGS. 2A-2D show operational views of an aspect of the system of FIG. 1A.
Figure 2B:
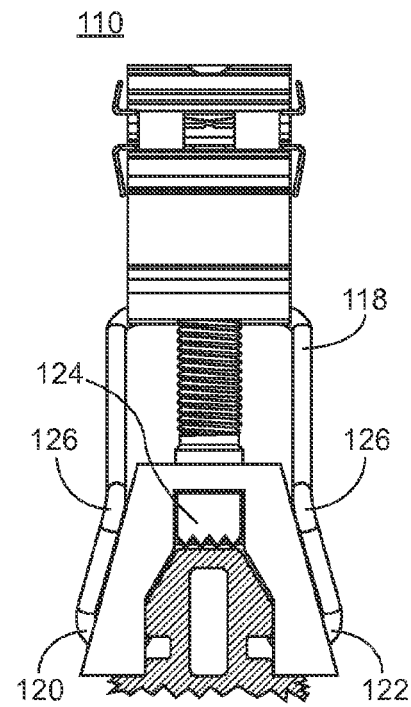

In use, spring clip unit 110 is placed over rail 104 with lever portion 118 in a raised position, as shown at FIGS. 2A and 2B. In this position, first tab 120 and second tab 122 are withdrawn within foot 112, due to the corner portions 126 of the first spring clip 116 interacting with the tapered sides 128 of the foot 112. The relative positioning of corner portions 126 with respect to the varying width of foot 112 causes first tab 120 and second tab 122 to spread relatively wide, and hence forcibly away from one another.

Figure 2C:
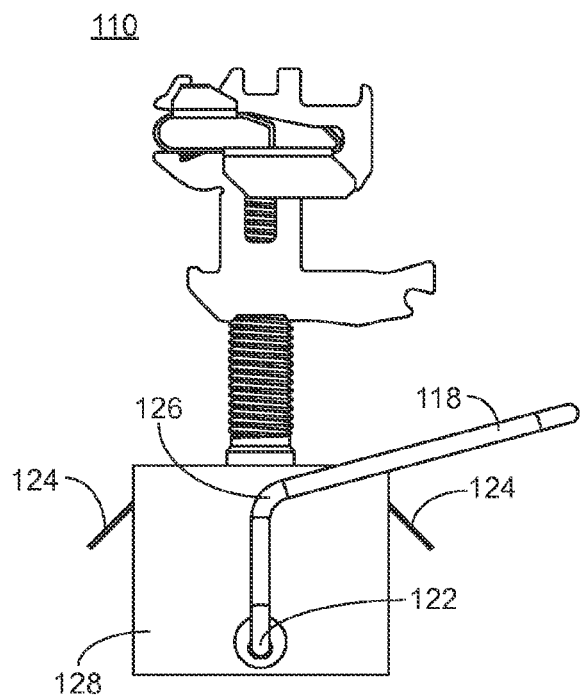
Figure 2D:
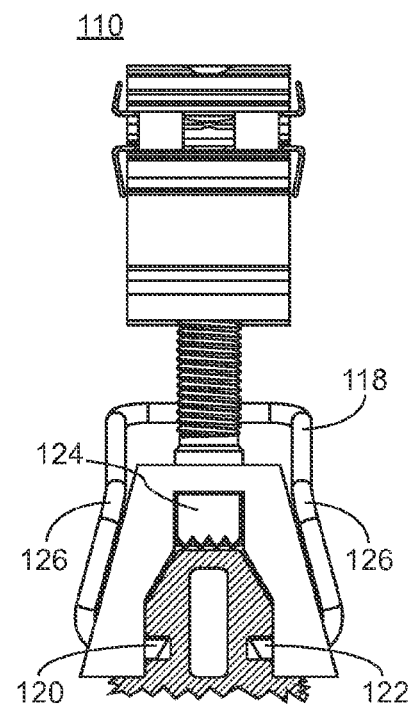

As seen in FIGS. 2C and 2D, moving lever portion 118 downward causes first tab 120 and second tab 122 to move inward due to the relative thinning of the width of foot 112 with respect to the corner portions 126, as corner portions 126 move upward along the tapered walls 128 of the foot 112. This causes first tab 120 and second tab 122 to simultaneously narrow and rotate, and thereby frictionally interlock with channels 108 of rail 104, and thus prevent relative movement between spring clip unit 110 and base portion 102. Advantageously, locking spring clip unit 110 may be performed manually without the use of tools. In various embodiments, the ends of first tab 120 and second tab 122 may be shaped (e.g., tapered, cammed, and/or beveled) to assist in this motion. Here, first tab 120 and second tab 122 are tapered and beveled, although that is not required.

In addition, second spring clip 124 is preloaded against the rail 104 to help prevent relative vertical movement between spring clip unit 110 and base portion 102, as well as to provide an electrical ground path between PV module coupling device 114 and base portion 102.

Figure 3:
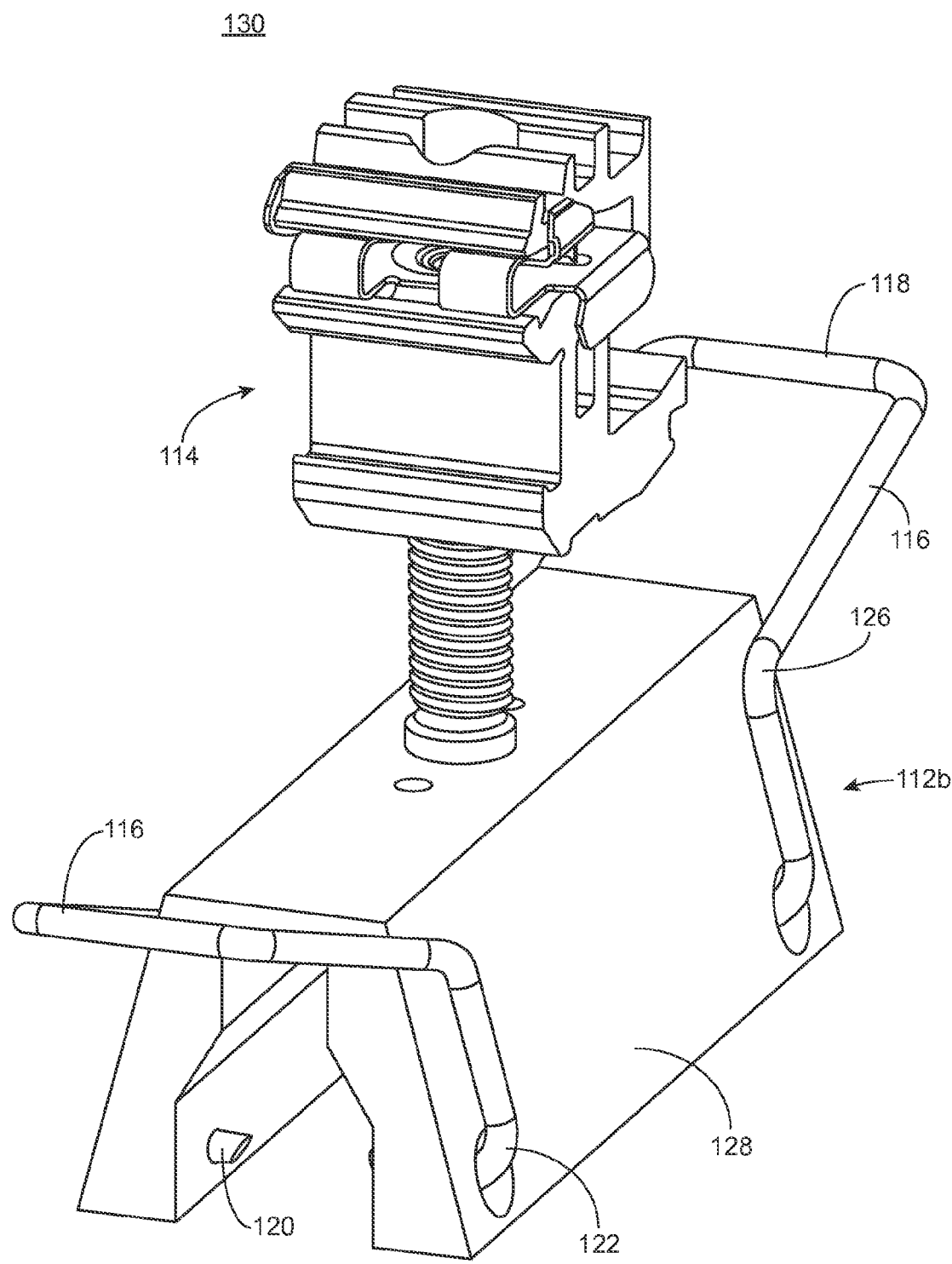
FIG. 3 shows a perspective view of another exemplary PV mounting system, according to an embodiment of the invention.

FIG. 3 shows double spring clip unit 130, which is structurally similar to spring clip unit 110 shown at FIG. 1B. The difference between spring clip unit 130 of FIG. 3 and spring clip unit 110 of FIGS. 1A, 1B, and 2 is that the foot 112b is longer and provisioned for an additional levered first spring clip 116 to allow for spanning over the passage 105 in base portion 102, and thus over a lag bolt penetrating through the base portion 102. Also, because foot 112b is longer than foot 112 and has two clamps that engage channels 108, foot 112b may provide a relatively stronger connection to base portion 102.

Figure 4:
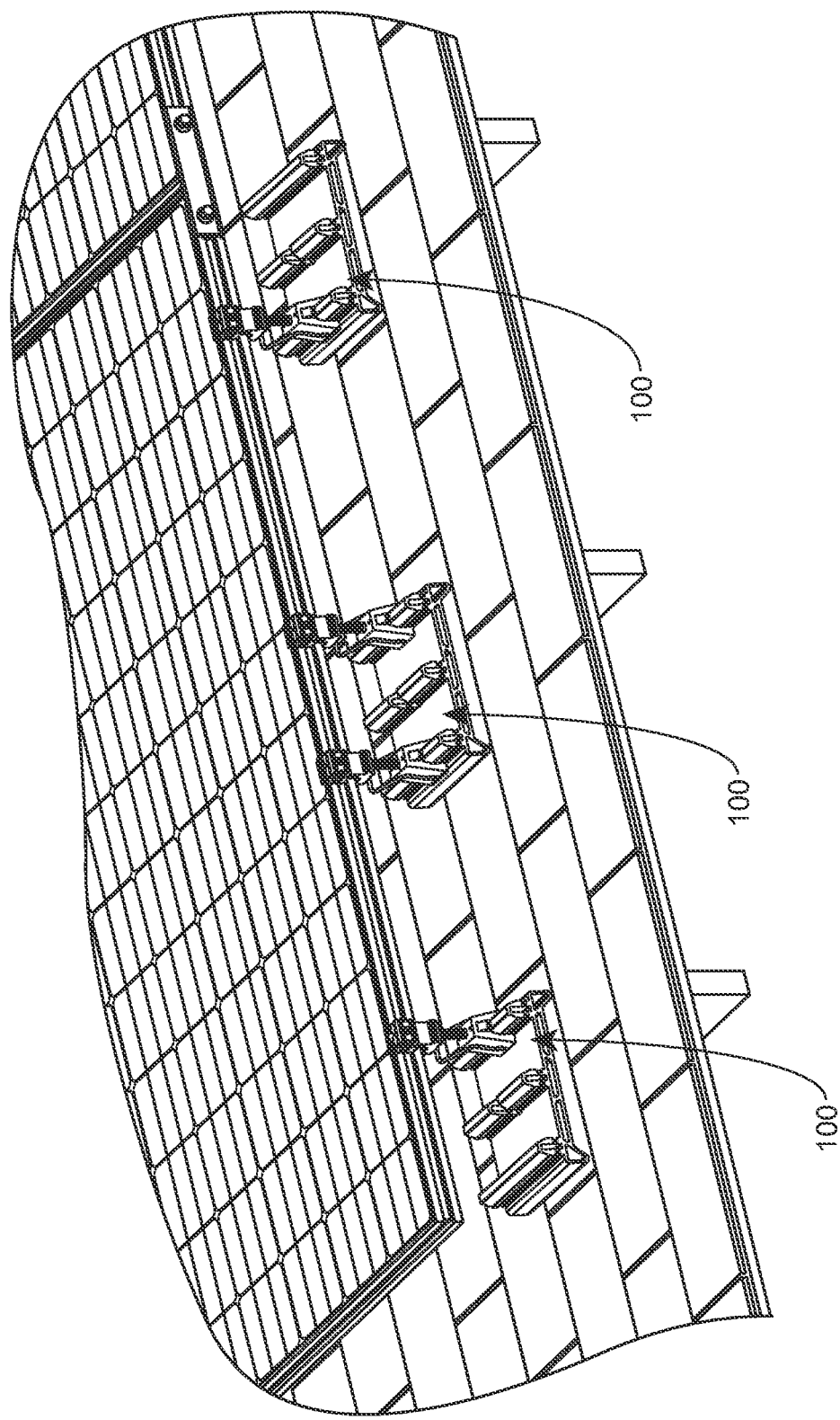
FIG. 4 show the system of FIG. 1A in use, according to an embodiment of the invention.
Figure 5:
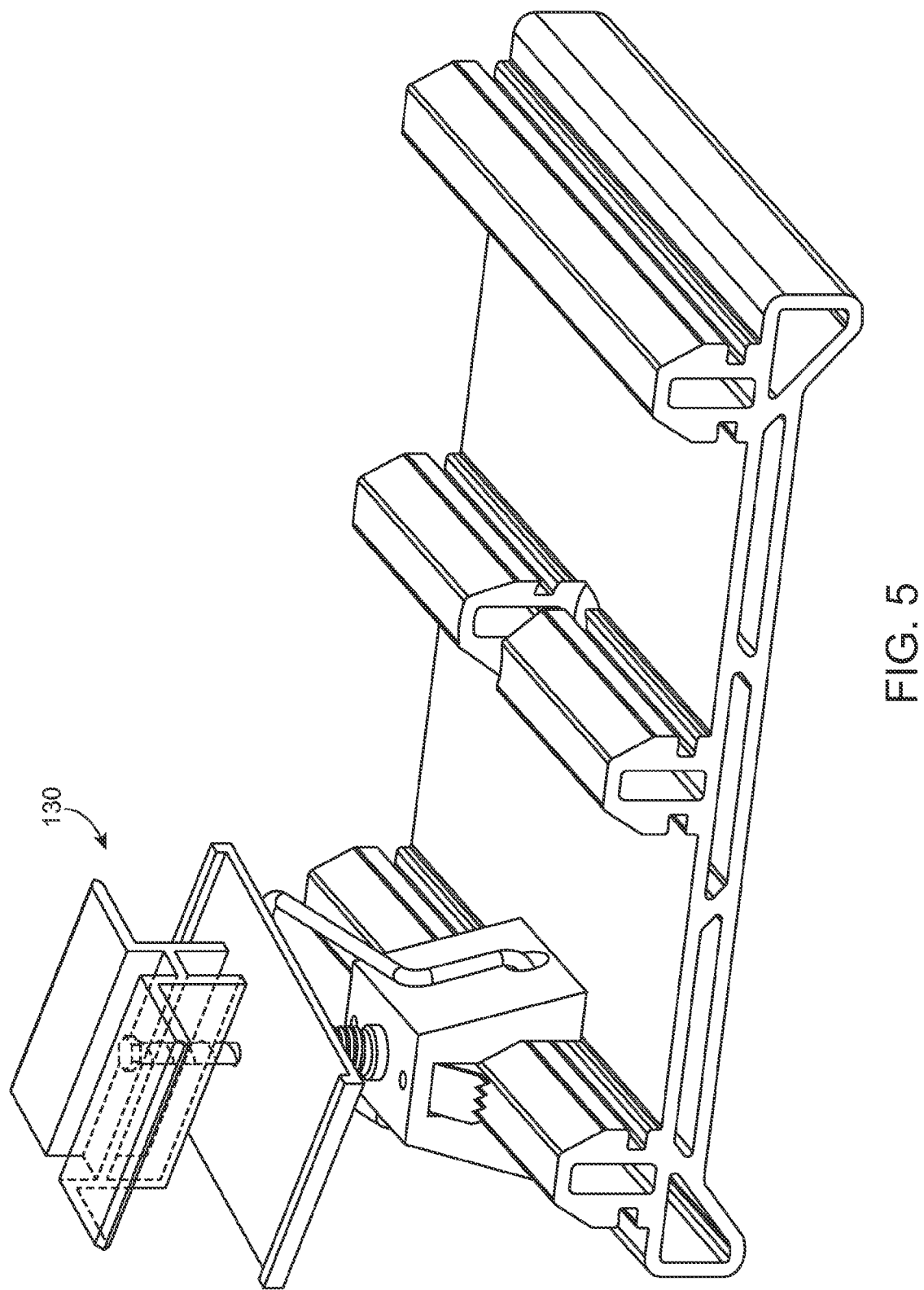
FIG. 5 shows a perspective view of another exemplary PV mounting system, according to an embodiment of the invention.

FIG. 4 shows a plurality of systems 100 mounted to a roof and supporting a plurality of PV panels. As shown, base portion 102 may advantageously be utilized to support more than one spring clip unit, although supporting more than one is not necessary. While system 100 is shown mounted to a sloped composite shingle roof, system 100 may be used on a variety of other structures.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A photovoltaic (PV) mounting system comprising:
a base portion comprising at least one rail;
at least one spring clip unit comprising:
a foot configured to hold a PV module coupling device and arranged to slide on one of the at least one rail;
a first spring clip moveable on the foot from a first position in which the first spring clip is disengaged with the at least one rail to allow the foot to move freely along the at least one rail, to a second position in which the first spring clip engages the rail to couple the foot to the at least one rail;
a second spring clip held by the foot, the second spring clip being forcibly engaged with the at least one rail when the first spring clip is moved into the second position;
wherein the at least one rail comprises a pair of channels on either side of the rail;
wherein the first spring clip comprises an elongated lever extending to first and a second tabs; and
wherein the first tab and the second tab are each arranged to pass through the foot and engage the pair of channels in the base when the lever is actuated to the second position of the first spring clip.

2. The PV system of claim 1, wherein the first tab and the second tab are each arranged to disengage from the base when the lever is actuated to the first position of the first spring clip.

3. The PV system of claim 1, wherein the second spring clip includes teeth arranged to forcibly engage the at least one rail and form a ground connection between the foot and the at least one rail.

4. A photovoltaic (PV) mounting system comprising:
a base portion comprising a plurality of raised rail portions, each raised rail portion comprising a pair of channels on either side of the rail portion, the base portion further comprising a through-hole for accommodating a roof surface attachment bolt; and
at least one spring clip unit, the at least one spring clip unit comprising:
a first lever-actuated spring clip that in a first position allows the at least one spring clip unit to fit over and move freely along one of the raised rail portions, and that in a second position causes a pair of tabs connected to the lever-actuated spring clip to engage the pair of channels in the raised rail portion; and
a second spring clip that engages a top of the raised rail portion, the second spring clip including one or more teeth that form a ground bond with the raised rail portion when the first lever-actuated spring clip is moved into the second position; and
a PV module coupling device attached to the at least one spring clip unit that is adapted to engage frames of at least two PV modules while maintaining a space in between them.

5. The PV system of claim 4, wherein the first lever-actuated spring clip comprises an elongated lever extending to a pair of corner portions that narrow and widen with respect to each other according to positioning of the first lever-actuated spring clip.

6. The PV system of claim 5, wherein a distance between the pair of tabs narrows and widens along with corresponding movement of the corner portions.

7. The PV system of claim 4, wherein the first lever-actuated spring clip comprises a wire-form structure.

8. The PV system of claim 4, wherein the second spring clip comprises at least one body that extends in cantilever from the at least one spring clip unit.

9. The PV system of claim 4, wherein the PV module coupling device comprises a clamp arranged to clamp onto top and bottom portions of a PV module.

10. The PV system of claim 4, wherein the each raised rail portion comprises a male shape.

11. The PV system of claim 10, wherein the at least one spring clip unit comprises a female shape that is complimentary to the male shape.

12. A photovoltaic (PV) mounting system comprising:
a base portion comprising at least one rail;
at least one spring clip unit configured to hold a PV module coupling device and comprising a foot and at least one lever to lock the at least one spring clip unit to the at least one rail;
wherein the at least one rail comprises a pair of channels on either side of the rail;
wherein the at least one lever comprises a first tab and a second tab; and
wherein the first tab and the second tab pass through the foot and are configured to engage the pair of channels in the base to lock the at least one spring clip unit to the at least one rail.

13. The PV system of claim 12, wherein the at least one lever is movable to unlock the at least one spring clip unit from the at least one rail.

14. The PV system of claim 13, wherein a first movement of the at least one lever causes a distance between the first and second tabs to narrow and engage the pair of channels.

15. The PV system of claim 14, wherein a second movement of the at least one lever that is opposite to the first movement causes the first and second tabs to forcibly spread apart from the pair of channels.

16. The PV system of claim 12, wherein the at least one spring clip unit comprises a plurality of levers.

17. The PV system of claim 12, wherein the at least one spring clip unit comprises teeth for engaging the at least one rail and for forming an electrical ground path therewith.

* * * * *